United States Patent

Washburn

[11] Patent Number: 5,678,609
[45] Date of Patent: Oct. 21, 1997

[54] AERIAL DUCT WITH RIBBED LINER

[75] Inventor: Robert B. Washburn, Amherst, Ohio

[73] Assignee: Arnco Corporation, Elyria, Ohio

[21] Appl. No.: 398,978

[22] Filed: Mar. 6, 1995

[51] Int. Cl.[6] .......................... F16L 11/04; F16L 11/12
[52] U.S. Cl. ........................... 138/107; 138/111; 248/49; 248/61; 248/75
[58] Field of Search ................... 138/107, 106, 138/111, 103, 121, 122; 248/61, 49, 58, 59, 60, 75; 174/101.5; 405/154

[56] References Cited

U.S. PATENT DOCUMENTS

| | | |
|---|---|---|
| 960,291 | 6/1910 | Egnér et al. . |
| 2,956,311 | 10/1960 | Raydt et al. . |
| 3,207,836 | 9/1965 | Slechta . |
| 3,267,201 | 8/1966 | Pusey et al. . |
| 3,532,783 | 10/1970 | Pusey et al. . |
| 3,540,203 | 11/1970 | Thoresen et al. . |
| 3,720,235 | 3/1973 | Schrock . |
| 4,160,872 | 7/1979 | Lundberg et al. . |
| 4,378,462 | 3/1983 | Arnold, Jr. et al. . |
| 4,410,476 | 10/1983 | Redding et al. . |
| 4,565,351 | 1/1986 | Conti et al. . |
| 4,650,715 | 3/1987 | Voser . |
| 4,662,712 | 5/1987 | Tabata et al. . |
| 4,791,965 | 12/1988 | Wynn . |
| 5,073,682 | 12/1991 | Walling et al. .................... 174/101.5 |
| 5,087,153 | 2/1992 | Washburn . |
| 5,089,074 | 2/1992 | Winter et al. . |
| 5,145,545 | 9/1992 | Winter et al. . |
| 5,238,328 | 8/1993 | Adams et al. . |
| 5,256,233 | 10/1993 | Winter et al. . |

FOREIGN PATENT DOCUMENTS

| | | |
|---|---|---|
| 1024228 | 1/1978 | Canada . |
| 1106381 | 5/1961 | Germany . |
| 547940 | 9/1956 | Italy . |
| 55-150502 | 11/1980 | Japan . |
| 398627 | 9/1933 | United Kingdom . |
| 2169094 | 7/1986 | United Kingdom . |
| 2258711 | 8/1992 | United Kingdom . |

*Primary Examiner*—Patrick Brinson
*Attorney, Agent, or Firm*—Pearne, Gordon, McCoy & Granger LLP

[57] ABSTRACT

An aerial duct having a first duct in which a support strand is contained for aerially mounting the aerial duct, and a second duct in which an inner duct or liner is contained through which a transmission or other cable is strung. A multiplicity of support strands or several braided support strands could be contained in the first duct. The first duct and second duct are joined by an intervening web so that the first and second duct have substantially parallel longitudinal axes. The inner duct has spaced apart ribs formed within its inner surface. Valleys are formed between the spaced apart ribs and adapted to retain lubricant placed therein for facilitating the passage of a transmission or other cable through the inner duct. The ribs can be either longitudinal, corrugated or spiral. If desired, the aerial duct and support strand could be made of an all-dielectric material.

38 Claims, 3 Drawing Sheets

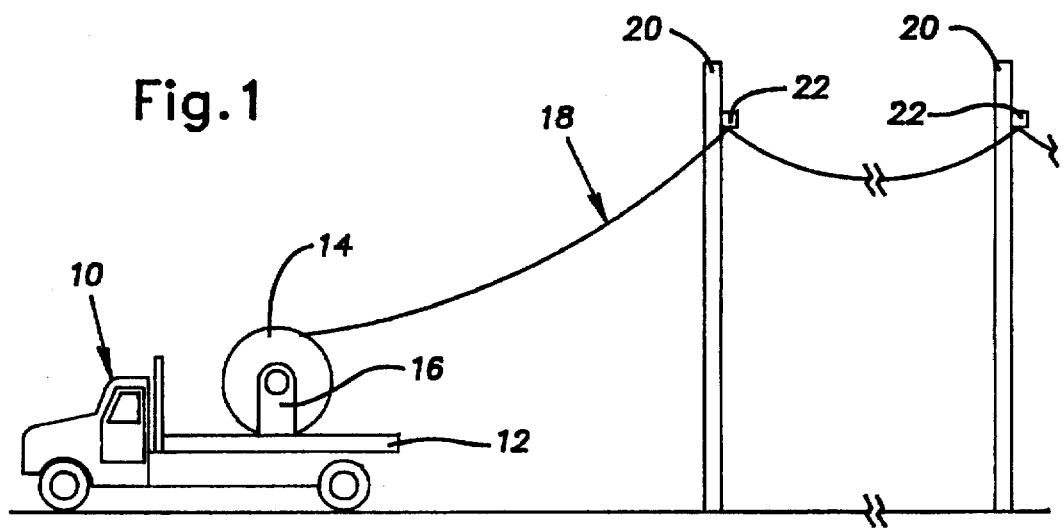
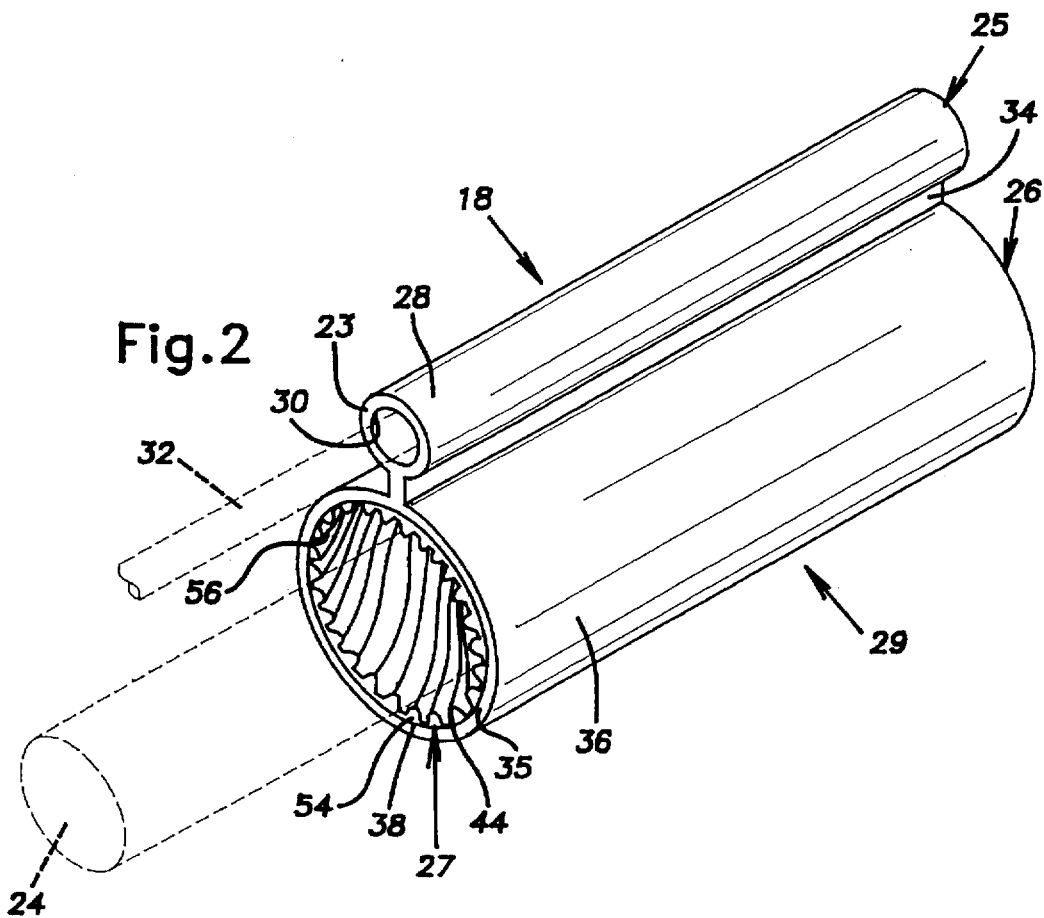

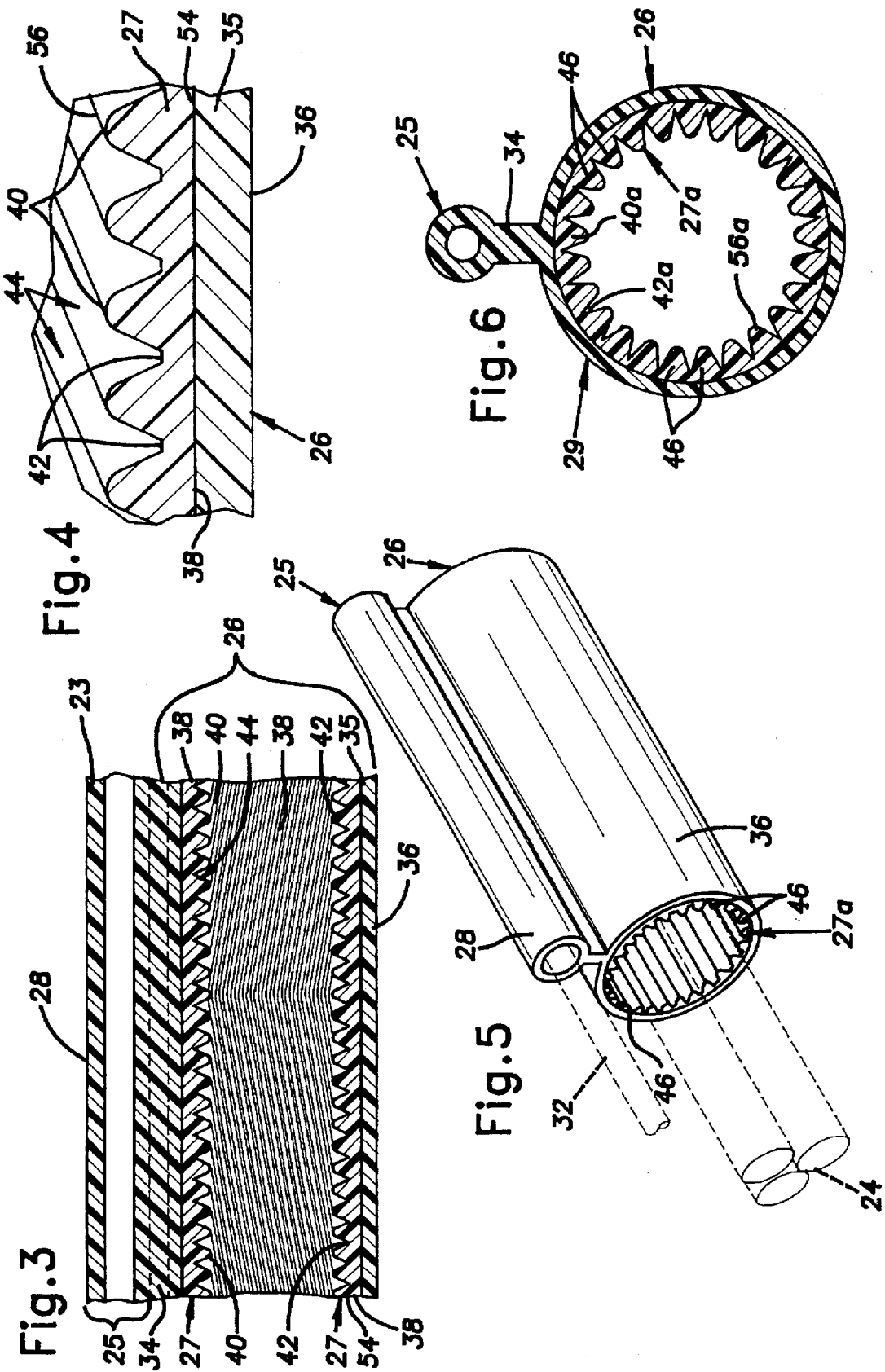

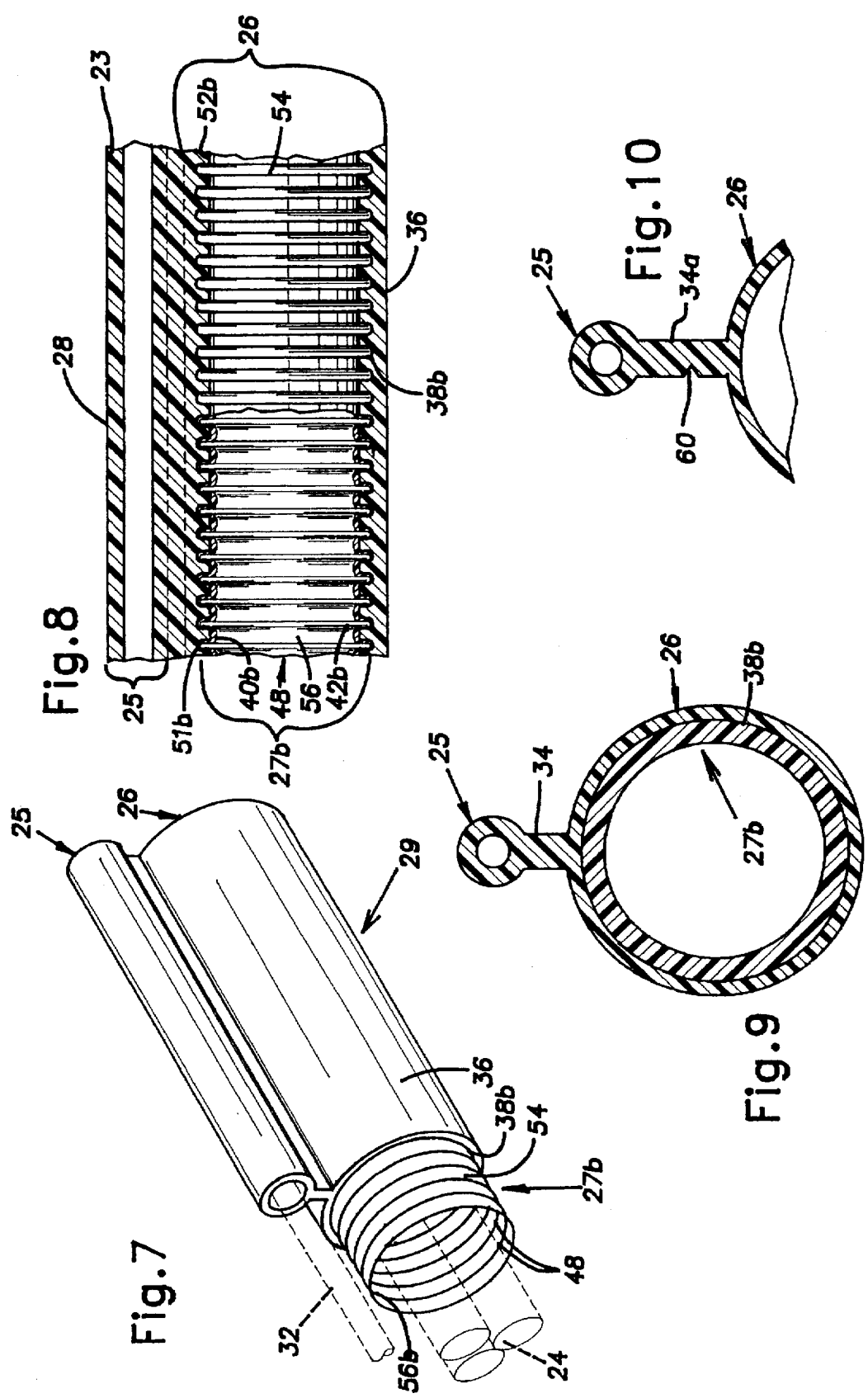

AERIAL DUCT WITH RIBBED LINER

BACKGROUND OF THE INVENTION

1. Field of the Invention

This invention relates to ducts adapted to receive a cable and, more particularly to such ducts which have a support strand encased within a support duct that is connected to a second duct having a liner and being adapted to receive transmission cable.

2. Description of the Prior Art

Continued advances in communication systems have been met with a concomitant increased need to connect fiber optic transmission cables directly to the users' premises. In some cases this can be accomplished with buried cable, however, in many instances, it is more cost effective to aerially mount the cable. For example, in urban areas it is often impractical to bury fiber optic cable, and aerially mounting the cable is the preferred method of installing it.

Aerial installations of transmission cables have been described in the art. Some aerially installed transmission cables have self-supporting capabilities incorporated into their design. However, transmission cables which do not possess the mechanical integrity to be self-supporting must either be lashed to a guide wire or inserted into a duct that is in turn lashed to a guide wire. The lashing process requires several steps which include stringing the guide wire between supports to a desired tautness; temporarily securing the transmission cable or duct containing the transmission cable to the guide wire; and permanently securing the transmission cable or duct to the guide wire with a lashing machine. These steps are time and labor intensive, and increase the expense of installation.

One technique implemented to avoid the lashing process is permanently joining the guide wire to the transmission cable by placing the guide wire within the sheathing which surrounds and protects the transmission cable. The guide wire is joined within the sheathing in an offset manner so the guide wire can be independently manipulated relative to the transmission cable. Thus, when the guide wire and transmission cable are aerially mounted, the guide wire is permanently fixed within the sheathing of the transmission cable, and the lashing process is eliminated.

Although fiber optic transmission cables have the benefits of speed and capacity over copper cable, they possess mechanical characteristics which require careful handling. Fiber optic cables are fragile in nature and sensitive to the differing coefficients of thermal expansion between plastic, glass, and metal. Therefore, fiber optic cables do not easily lend themselves to having a guide wire permanently joined within the sheathing surrounding them without potentially damaging the fiber optic cable. Also, the fragility of fiber optic cable prevents it from being lashed to a guide wire without possible damage resulting. Consequently, an approach to aerially mounting fiber optic transmission cable which will allow damaged or obsolete transmission cable to be replaced in a reasonably practical and cost effective manner is needed.

One example of self-supporting transmission cable is disclosed in U.S. Pat. No. 4,763,983 issued to Keith which is hereby incorporated by reference. Keith discloses an optical transmission cable with the messenger being formed of an all-dielectric construction. As indicated in Keith, an all-dielectric construction is desirable for electrical power or telephone companies, among others, because it can be suspended in conjunction with existing line structures without induced voltage problems inherent in a transmission cable with a metallic messenger wire. From Keith, it is seen that it would be advantageous to provide a ducted cable which is non-conductive for installations where such a need is desirable. Such a cable would help protect fiber optic cable where lightning is a concern, and would not require grounding.

Fiber optic transmission cable is usually encased within a thermoplastic sheathing. When installing or replacing a cable within a duct there are a number of problems that must be avoided. The plastic sheathing must not encounter any sharp surfaces that might damage or shave it away to any substantial degree. If the plastic sheathing is damaged in any way, detrimental exposure of the fragile optic transmission cable occurs.

Previously, during underground installation, transmission cable was pulled through an inner duct. An example of this method is shown in U.S. Pat. No. 4,565,351, which is hereby incorporated by reference. Smooth wall ducts have the highest coefficient of friction, and therefore require high forces to be used when pulling an optic transmission cable therethrough. As a result, only relatively short lengths of cable can be used before the forces build up to the point that the cable becomes endangered. Previously, smooth wall conduits were used to hold the fiber optic cables. An example of a smooth duct wall approach is UK Patent Application GB225871 wherein an empty conduit with a detachable cable is disclosed for use in underground installation. The conduit is detachable by the release of a jacket which surrounds the conduit. The conduit, which contains the optic fiber cable, and the jacket are formed of the same material, usually polyvinyl chloride (PVC).

As was disclosed in U.S. Pat. No. 5,087,153 issued to the same inventor as herein, and hereby incorporated by reference in its entirety, corrugated ducts when used alone in the standard process of burying ducted cable is very problematic. U.S. Pat. No. 5,087,153 disclosed that although corrugated duct, i.e. transverse ribs, have a lower coefficient of friction than smooth wall ducts, corrugated ducts have relatively thin and non-uniform wall thickness. Moreover, the thin walled corrugations have a tendency to stretch or break during field installation due to their relatively low tensile strength, and wear quickly when transmission cable is pulled therethrough. The flexible nature of corrugated tubing also allowed it to rotate and shear. However, as discussed below, it has been found that corrugated ribs provide a very low coefficient of friction and the problems associated with its flexible nature can be overcome by using it as a liner contained within a separate distinct duct.

The biggest problems associated with designing self-supporting aerial duct systems are as follows:

1. The effects of thermal expansion/contraction of the duct system.
2. The handling properties of the duct based on its mechanical design.
3. The problems associated with installation of duct aerially.
4. The integrity of design based on the loads that will be experienced during storm loading and galloping in high winds.

Polyethylene duct products have historically been made out of high density polyethylene resins because their higher crystallinity imparts high strength, high modulus of elasticity, surface hardness and low friction. This higher hardness improves pulling performance significantly, and imbues the duct with toughness and resistance to ovalization and kinking. For inner ducts, which may be pulled into a main conduit, the high modulus of elasticity also resists premature elongation and stretching, which could otherwise damage the duct or compromise the diameter by either ovalizing or necking. Most significantly, the low surface friction of high density polyethylene (HDPE) makes it the material of choice when building a duct product.

The teachings of underground duct installation using HDPE as the material of choice, do not satisfy the list of problem criteria listed above. It has been observed that HDPE has undesirable side effects when used alone in an aerial self-supporting product.

Thermal expansion is a significant problem. Unchecked, it can cause kinking of the duct at joints, corners or vertical transitions. Essentially anywhere that the duct is separated from the support strand expansion loads will begin to concentrate. HDPE expands 10 to 14 times as much as the steel strand, and may result in a difference in length of over 50 inches in a 300 ft. span of duct over a temperature drop of 120° F. to –20° F.

The tendency for this difference in length to be realized is largely a function of what resistance the support strand is able to impart to the expanding or contracting duct, and how the stresses of the expansion/contraction can be absorbed by the materials. At elevated temperatures HDPE softens somewhat to around 75,000 psi modulus, and is capable of absorbing some of the expansion stress. As the temperature drops, however, the modulus of elasticity quickly climbs to over 350,000 psi and will instead induce shearing of the bond at the strand, with relatively little motion of the duct on the strand.

If the duct is allowed to move on the strand, several problems arise. Couplings of joined lengths of duct will pull apart. Once the duct pulls out of its coupling, the probability of it moving back in with proper alignment during an expansion cycle is not 100%, and so the possibility of a kink of the cable at that juncture is highly probable.

If the duct is cut away from the strand for a length, this location becomes a discontinuity in the resistance to expansion forces. Excess duct is then seen to push into this discontinuity resulting in kinking of the duct. It is necessary, however, to cut the duct away from the strand at locations where the duct changes direction, such as vertical transitions down the pole, sweeping turns generally greater than 45°, and when joining lengths of duct together. This reality mandates the use of expansion joints in the aerial installation when HDPE is used alone.

Expansion and contraction of the duct surrounding the support strand can also cause problems in the long term survivability of the aerial duct. Continued cycles break down adhesive systems, and the continual rubbing can saw through this duct. Once the duct has been compromised a discontinuity forms. The expansion and contraction of the duct filling the discontinuity causes further accelerated destruction of the bond and jacket at the periphery of the discontinuity. Unattended, kinks or general unzipping of the duct from the strand can occur. Obviously this is a major problem since these duct systems would be commonly zigzagged across streets and highways Accordingly there is a need in the art to overcome the above discussed disadvantages while maintaining the benefits obtained when using HDPE as a conduit for the fiber optic cables.

SUMMARY OF THE INVENTION

The present invention comprises an aerial duct having multiple ducts for supporting optic transmission cable, and the like, comprising: a first duct; a support strand contained within said first duct, said support strand having a sufficient strength to hold the aerial duct suspended between pole supports; a second duct having an outside surface and an inside surface, said second duct being joined to said first duct; an inner duct contained within said second duct having an exterior surface and an interior surface; and a multiplicity of ribs formed along the length of the interior surface of said inner duct, said ribs having peaks of a predetermined height which are spaced apart a predetermined distance so that valleys are formed therebetween. The rib's valleys function to reduce contact between the cable and the duct surfaces and to store lubricant that facilitates the passage of an optic transmission cable through the second duct.

The first duct and second duct are joined by an intervening web so that the first duct and second duct have substantially parallel longitudinal axes. The web is connected to the exterior surfaces of both the first and second duct. The web may also have a notch for controlled slitting. The first duct, the web, and the second duct comprise a jacket formed around the inner duct or liner and support strand.

The inner duct or liner is preferably formed of a different material than that of the first and second duct, although this does not necessarily need to be the case. Usually, the inner duct or liner is formed from High Density Polyethylene (HDPE) to take advantage of the low coefficient of friction, and the first duct, web, and the second duct comprising the jacket are formed from a Linear Low Density Polyethylene (LLDPE) to take advantage of the lower modulus of elasticity.

BRIEF DESCRIPTION OF THE DRAWINGS

FIG. 1 illustrates a first embodiment of the aerial duct being strung between two pole supports;

FIG. 2 is a partial perspective view of the aerial duct of FIG. 1 with the support strand and fiber optic cable shown in dashed lines;

FIG. 3 is a partial longitudinal cross section of the aerial duct of FIG. 2;

FIG. 4 is a partial expanded view of the internal spiral ribs of the aerial duct of FIG. 3;

FIG. 5 is a partial perspective view of a second embodiment of the aerial duct having longitudinal ribs;

FIG. 6 is a transverse cross section of the aerial duct of FIG. 5;

FIG. 7 is a partial perspective view of a preferred embodiment of the aerial duct having transverse ribs;

FIG. 8 is a partial longitudinal cross section of the aerial duct of FIG. 7;

FIG. 9 is a transverse cross section of the aerial duct of FIG. 7; and

FIG. 10 is a transverse cross section of the web having a notch.

DESCRIPTION OF THE PREFERRED EMBODIMENT

Referring now to the drawings, and in particular to FIG. 1, there is shown a truck 10 having a bed 12 upon which a spool 14 is rotatably support by spool support 16. A preferred embodiment of the ducted support strand or aerial duct 18 is wound around spool 14 for storage, transportation, an installation purposes. FIG. 1 shows the aerial duct 18 being strung between two pole supports 20. The ducted support strand or aerial duct 18 is connected to the pole supports 20 via mountings 22 in any conventional manner. As the aerial duct 18 is mounted, the truck 10 moves ahead slowly so the aerial duct 18 can be unwound and connected to the next pole support. The technique of aerially mounting duct can be accomplished in any suitable manner. Once the aerial duct 18 is suspended, the fiber optic transmission cable 24 or other cable can be strung through a second duct 26 of the aerial duct 18, as best shown in FIG. 2.

Referring now to FIGS. 2–4, there is shown a first embodiment of the aerial duct 18. The aerial duct 18 includes a support or first duct 25 and a conduit or second duct 26. The first duct 25 includes a wall 23 having an outer surface 28 and an inner surface 30. A support strand 32 is encased within the first duct 25. The support strand 32 is used to secure the aerial duct 18 to the mountings 22 in any conventional manner and contributes to the overall strength and rigidity of the aerial duct 18. The support strand 32 is molded within the first duct 25 when the aerial duct 18 is extruded or otherwise manufactured. Alternately, the support strand 32 could be placed within the first duct 25 after the first duct is manufactured.

Preferably, the support strand 32 is made of extra strength Class C steel which is galvanized to reduce corrosion of any exposed areas but could alternatively be made of other suitable material known in the art. The support strand 32 is preferably a multistranded twisted strand for a large diameter aerial duct (ducts having a second duct inside diameter of one inch or greater). Preferably, the multistranded twisted strand is a twisted multiple of seven strands of steel having a diameter of at least 0.25 inches and a tensile strength of at least 6600 pounds when the aerial duct 18 is connected between pole supports 20 spaced about 200 feet apart. Typically two sizes of multistranded twisted strands will be used for large diameter aerial ducts: 7×0.080 inches with a nominal strand diameter of 0.25 inches and tensile strength of 6650 pounds; and 7×0.120 inches with a nominal strand diameter of 0.375 inches and a tensile strength of 11,500 pounds. For smaller aerial ducts (a second duct inside diameter of one inch or less), a single strand of steel may be used. For example, a single strand with a diameter of about 0.109 inches and a tensile strength of about 1200 pounds may be used with an aerial duct having an inner diameter of about 0.63 inches. Alternatively, multiply bundled twisted wires could be braided or twisted and inserted within the first duct 25, or; multiple support strands 32 can be linearly placed within the first duct 25 to further increase the rigidity and/or strength of the aerial duct 18. Multiple strands could further reduce rocking or rotation of the aerial duct 18 in high winds. The support strand 32 could alternatively be made of fiberglass, Kevlar, polyester, or other synthetic fibers such as a polyaramide composite, for example, when necessary to maintain the dielectric integrity of a fiber optic transmission system.

As shown in FIGS. 2–4, encased within the second duct 26 is the liner or inner duct 27 which has an exterior surface 54 and an interior surface 56. The exterior surface 54 abuts or lines the inside surface 38 of the second duct 26. The first duct 25 is joined to the second duct 26 by an intervening web 34. The web 34 is designed to provide adequate separation of the first duct 25 and the second duct 26 so that the first duct 25 can be properly clamped or otherwise secured to the pole supports 20. Preferably, the web 34 is about 0.120 inches in width and about 0.250 inches in height for use with a second duct 26 having an inside diameter of about 1.520 inches and an outside diameter of about 1.660 inches.

The stresses exerted by the second duct 26 can be absorbed, to a degree, by the web 34. This effect reduces the demands on the adhesive system at the strand and in turn improves the integrity of the duct system. Increased web height allows for the expansion stresses to be absorbed over the web, as opposed to transferring them directly to the strand.

However, increased web height, increases the profile exposed to the wind, and tends to exacerbate the tendency of the duct 26 to move as a sail, or lift like an airplane wing. High winds would be expected to induce galloping in long spans. It is thus important to keep the thickness of the web 34 heavy enough to resist tearing, and the height of the web 34 small enough to avoid these consequences. Both lowering the web material modulus, and corrugating the inner duct 27 allow for the utilization of a shorter web 34.

As is shown in FIG. 10, a molded narrowing or notch 60 may be formed in the web 34a in order to have a more controlled path for slitting and to make the web 34a more facile to cut. The notch 60 should be located nearer to the second duct 26, certainly no further than ½ half the length of the web 34a away from the second duct 26. The notch 60 located nearer to the second duct 26 prevents the shear stress that is expected if the notch 60 is located nearer to the first duct 25. Preferably, the notch 60 extends no more than one half the way through the thickness of the web 34.

Referring again to FIGS. 2 and 4, the second duct 26 includes a wall 35 having an outside surface 36 and an inside surface 38. The interior surface 56 has spiral ribs 44 formed thereon which define peaks 40 and valleys 42 running the length of an inner duct or liner 27 encased within the second duct 26. Preferably the inner duct 27 has an outside diameter smaller than that of the inner diameter of second duct 26. Preferably, the thickness of the liner 27 from peak 40 to exterior surface 54 is between 0.02 inches to about 0.25 inches.

The problems with designing a self-supporting aerial duct system described above were addressed as follows. First, a jacketing process was developed, whereby the liner 27 is formed first, and a jacket 29 is formed over the liner 27 and the support strand secondly. The term "jacket" as used herein to describe the present invention refers to the first duct 25, the web 34, and the second duct 26. Because of this jacketing process, the materials used in the liner 27 relative to the jacket 29 can be selected from a wide variety of choices. Since HDPE is still the desired choice for low pulling friction, the liner 27 should remain HDPE. Alternatively, the liner 27 could be formed of PVC. The jacket 29, on the other hand, can be comprised from a material which would be more flexible and stress relieving.

It has been found that linear low density polyethylene (LLDPE) is ideal for this application. The LLDPE is found to handle much easier, and because it is inherently more flexible, the aerial duct 18 handles more like a cable, with less coil set and snaking. Also being softer, it is more easily cut by the lineman's knife, so installation is much easier.

The lower modulus of elasticity of LLDPE allows the plastic to absorb the stresses induced by expansion and contraction to a much greater extent than HDPE. Despite LLDPE's unique characteristics, the jacket 29 may also be formed of olefinic materials, such as olefinic elastomers.

The ribs within the inner duct 27 may be either spiral 44, unidirectional or alternating (FIG. 2); longitudinal 46 (FIG. 5), or corrugated 48 (FIG. 7). The peaks 40, 40a, 40b of the ribs form a surface over which the fiber optic cable may pass at reduced friction.

The use of spiral 44 and corrugated 48 ribs have been found to give the best combination of results when used with a fiber optic cable 24 for reducing the friction between the cable 24 and the inner duct 27, providing structural integrity of the tubing, and not damaging the sheath on the cable 24. The spiral 44 and corrugated 48 ribs have the advantage in that the ribs do not shave off the sheathing because the cable tends to pass over them in a transverse manner. Moreover, the internally spiraled duct is structurally strong and does not have a tendency to rip or tear during its installation. It is also flexible enough to go around corners if necessary. Also, the problems associated with the flexibility of the corrugated duct when used alone have been overcome by using the corrugated duct as an internal liner 27.

The following embodiments include structural features such as the web 34 which are identical to those described above. For convenience, these features have been assigned the same reference numeral where appropriate. In each of the embodiments, the web 34a shown in FIG. 10, having the notch 60, is interchangeable with the web 34, to thereby attain the benefits of the notch 60 discussed above.

A second embodiment, shown in FIGS. 5 and 6, includes longitudinal ribs 46 formed by the liner 27a running the length of the second duct 26. The longitudinal ribs 46 also form peaks 40a and valleys or furrows 42a running the length of the liner 27a.

The third embodiment, illustrated in FIGS. 7-9, has corrugated ribs 48 along the length of the liner 27b forming peaks 40b and valleys 42b. The use of a corrugated duct as the liner 27b has many benefits associated with it. Because the liner 27b would be best comprised of HDPE, it would still be expected to expand and contract in a negative fashion as discussed above. Substituting a transversely corrugated liner 27b would allow the liner 27b to act as an accordion with regard to the expansion/contraction forces.

In this fashion, the most significant problem in self-supporting duct designs can be eliminated through a corrugated HDPE liner 27b jacketed by a flexible LLDPE jacket 29. With this design, the shear forces at the support strand 32 can be minimized, so that the integrity of a support strand adhesive system can be maximized and the deleterious consequences of using HDPE alone are eliminated. As a result, expansion joints can be eliminated.

Another advantage of the corrugated liner 27b is low friction. The corrugated inner duct 27b offers one of the lowest friction configurations, since the contact area between the cable 24 and duct 27b are reduced to a series of points. The problem with corrugated ducts, however, is that their inherent flexibility generally results in a less than straight installation, and the twists and undulations resulted in higher loads. In this design, on the other hand, the support strand 32 encased within the first duct 25 holds the aerial duct 18 in position, insuring a straight path.

In addition, the corrugations contribute significant hoop or crush strength. This allows the combined wall thickness of the second duct 26 and the liner 27 to be reduced. The corrugations also function to lock the second duct 26. What results is an aerial duct 18 that has better flexibility and handling characteristics, has high crush strength and resistance to kinking, exhibits lower pulling friction, eliminates the need for expansion joints, has lower material cost, is easier for the lineman to install, and has the highest long term structural integrity.

The liner 27, 27a, 27b respectfully, is essentially a stand-alone duct, around which a second duct 26 is placed. The jacket 29 around the liner 27 comprises the second duct 26, the first duct 25, and the web 34. These three are usually co-extruded. This allows considerable flexibility in adding features. Lubrication may be introduced, either as a surface spray to the interior surface 56, 56a, 56b respectfully, or in the compound throughout the body of the interior surface 56. In the latter case, the compounded lubricant migrates to the interior surface. Because there are discrete layers, separate colors for identification purposes can also be used.

The manufacturing process may be a dual pass system which extrudes the liner 27 first, then passes the liner 27 through the line a second time to add self-supporting features such as metal or reinforcing fibers. This method also allows an armored duct to be formed by wrapping, longitudinally or spirally, a layer of metal or fiber-reinforced composite around the liner 27 prior to applying the jacket 29 and self-supporting features. The approach taken is a dual pass system, not coextrusion, however co-extrusion could be used if some of the options were limited.

Both the support strand 32 and liner 27 can be glued to the jacket 29 with a flexible hot-melt adhesive. This is critical because of the thermal expansion and contraction characteristic of unreinforced plastics. By bonding the first duct 25 to the support strand 32, the expansion stresses can be held back and dissipated though the web 34. This prevents a number of problems which would otherwise occur in aerial installation, such as: kinking of the aerial duct 18 and fiber optic cable 24 in corners due to expansion, pull-out of couplers due to contraction, saw-through of the support strand 32 though the jacket 29, etc. Putting the strand 32 in adhesive also acts to resist the penetration by water, which could induce corrosion of the strand 32, and result in damage to the first duct 25 due to expansion of ice.

Large, light weight, suspended structures such as self-supporting cable and self-supporting duct have special problems with harmonic vibrations. Because of their light weight and relatively large surface area, they are driven easily by the wind. If they have sufficient rigidity, and lack damping mechanisms, their oscillation in the wind can easily reach destructive amplitude. A glued liner construction is a means for incorporating damping into the composite design.

The dual pass system also allows the creation of multiple duct combinations. This is very important because it is labor intensive to install support stranding and aerial ducts, but is generally very easy to pull cable into an aerial duct system. A multiple duct composite design requires the same equipment and effort to install as a single duct system, but offers the capacity of future modifications. Otherwise, additional cables would have to be lashed to the structure. An alternate configuration of the preferred embodiments described herein could include more than one inner duct in case it was necessary to keep various transmission cables separate from one another.

The use of spiral 44 ribs on the interior surface 56 of the liner 27 as shown in FIG. 2, which is encased within the second duct 26 has been found to reduce dramatically the coefficient of friction without noticeably damaging the fiber optic transmission cable sheaths when placing the fiber optic cable in the liner 27. The coefficient of friction (f) between the fiber optic transmission cable 24 and the liner 27 as the cable 24 passes over the spiral ribs 44 can be measured over various load and velocity conditions by pulling cable 24 through an aerial duct coiled about a fixed drum. The following mathematical relationship can be used to calculate values of f from cable tension measurements leading into and out of a duct loop:

$$f = \frac{1}{2\pi n} \times \ln\left(\frac{T_o}{T_i}\right).$$

where $T_o$ is Tension out, $T_i$ is Tension in, n is the number of complete duct wraps about the fixed drum, $\pi$ is equal to 3.1416 and ln is the natural logarithm.

It has also been found that velocity has an effect on the measured values such that either load or velocity must remain constant to compare test data. Through testing, which was detailed in U.S. Pat. No. 5,087,153 which is incorporated by reference in its entirety herein, it has been found that the relationship between f and velocity varied in a predictable way which could be mathematically expressed as $K = f/\ln V$, where (K) is known as the velocity-compensated frictional load factor and (v) the average velocity. By comparing values of K, a more accurate picture is expressed relating friction, velocity, and load.

Furthermore, the testing demonstrated that the coefficient of friction is minimized, at between one and three feet per revolution.

The testing showed other important ramifications. Regardless of how sharp the spiral ribs 44 were pointed, no cutting or abrasion to the fiber optic cable sheath was observed. This is a significant improvement over smooth wall duct. In those cases, resulting damage from shearing, cutting, and fusion to the cable commonly occurred. In the tests, the spiral ribbed duct did not itself incur any damage. Moreover, there was no tendency to accumulate twist in the cable 24 with an oscillating spiral.

Because lubricants are commonly used during fiber optic transmission cable placement, it is desirable to keep the frequency of spirals as low as possible in order to have the lubricant pass efficiently along the transmission cable. With a low frequency spiral, lubricant is free to move along the interior of the second duct 26 thereby gaining the benefit of low friction with ease of lubrication. With lubrication manufactured by Arnco Corp., Model No. HL150DF load factors as low as 0.0050 have been measured for cable traveling at 100 ft./min with an incoming load to 200 pounds tension going into a 420 degree arc.

The second duct's 26 inside diameter is not critical, although typically it ranges from 0.4 inch to about 2 inches. The inner duct's 27 inside diameter and wall thickness being slightly smaller so that it will fit in the second duct 26. Wall thickness may also vary, but common to this invention are sizes such as Standard Thermoplastic Pipe Dimension Ratio (SIDR) 5 through 21. The wall thickness of the first duct 25 and the second duct 26 preferably ranges from about 0.04 inches to about 0.2 inches. Rib height for spiral 44, longitudinal 46, and corrugated ribs 48 typically varies from about 0.005 inch to 0.250 inch from furrow to peak, with the preferred height for spiral 44, and longitudinal 46 ribs being about 0.020 inch, and the preferred height for corrugated ribs 48 being about 0.120 inch. Rib spacing for ribs typically varies between from about 0.025 inch and 0.500 inch, with the preferred spacing being about 0.125 inch for spiral 44, and longitudinal 46 ribs, and the preferred spacing for corrugated ribs 48 being about 0.300 inch. The frequency of spirals can range between 1.0 revolutions per foot and 0.05 revolution per foot, the preferred being about 0.33 revolution per foot, or one revolution every three feet. The direction of spiral rotation can be altered in a periodic fashion to create a sinusoidal wave, as well, without diminishing the improved effect.

The second duct 26 of the preferred embodiments are substantially circular in cross section. However, the second duct 26 could alternatively be oval, triangular, rectangular, or other shapes in cross section if necessary.

As shown in FIGS. 7–9 the exterior surface 54 of the corrugated inner duct 27b has apexes 51b and recess 52b which can be formed to be in contact with the interior surface 38b of the second duct 26 by coextrusion. Preferably however, the inner duct 27b is constructed first. A layer of metal or fiber reinforced composite (not shown) may be wrapped longitudinally or spirally around the inner duct 27b prior to applying the polymer jacket 29 which forms the second duct 26 the web 34, and the first duct 25. Besides the advantages of this wrapping to further reduce expansion and contraction, prior wrapping prevents the flexibilized polymer jacket that forms the first duct 25, the web 34, and the second duct 26 from entering the recesses 52b of the inner duct 27b. Thus, flexibility of the inner duct 27b is not affected because the desired affect of the corrugated inner duct 27b is maintained. Of course, if decreased flexibility of the inner duct was desirable, the wrapping could be partially or entirely omitted and the recesses 52b could be permitted to be filled. The metal or fiber reinforced composite may also function to protect the inner duct 27 from external damage. This damage is often caused by rodents such as squirrels, which are known to cause significant damage to aerial installations, or other forms of mechanical abuse such as gunshot damage.

The inner duct 27 being made from a different material than the second duct 26, web 34, and first duct 25 has many desirable ramifications. High density and Linear Low Density Polyethylene have different physical characteristics discussed herein which heretofore have not been exploited for the formation of aerial ducts.

The modulus of elasticity for HDPE is much greater than that of LLDPE. Therefore, LLDPE allows expansion of the polymer but does not cause too much stress. Under normal weather conditions, the modulus of elasticity for HDPE ranges from about 120,000 psi to about 200,000 psi and that of LLDPE ranges from about 20,000 psi to about 40,000 psi. Although HDPE could be used as the outer jacket (first duct 25, web 34, and second duct 26), and LLDPE as the interior liner or inner duct 27. As discussed above, the preferred embodiments have the outer jacket formed of LLDPE and the liner formed of HDPE. The low stress associated with LLDPE eliminates the need for expansion joints and allows for the aerial duct 18 to be attached at the poles which are spaced from 30 feet to about 300 feet. The LLDPE allows expansion, but does not produce a great deal of force. HDPE on the other hand has a desirable coefficient of friction in relationship to the optical fibers, and the corrugated ribs allow for a desired degree of flexibility, as well as expansion and contraction.

Another advantage of using LLDPE as the jacket 29 is that it is able to be cut very easily. This allows for facile replacement. Furthermore, the LLDPE and HDPE could be made of different color so that when slicing the outer jacket 29, the operator of the cutting device would know that he has reached the inner duct or liner 27. Additionally, the tensile strength of HDPE would provide added protection for the very sensitive optical cables.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the invention is not to be limited in scope and effect to the specific embodiments herein shown and described nor in any other way that is inconsistent with the extent to which the progress in the art has been advanced by the invention.

What is claimed is:

1. An aerial duct having multiple ducts for supporting optic transmission cable and the like comprising:
   a first duct;
   a support strand contained within said first duct, said support strand having a sufficient strength to hold the aerial duct suspended between pole supports;
   a second duct having an inside surface and an outside surface, said second duct having a self-maintained cross section and being joined to said first duct;
   a polymeric inner duct having a low coefficient of friction contained within said second duct having an exterior surface and an interior surface; and
   a multiplicity of ribs formed along the length of the interior surface of said inner duct, said ribs having a predetermined height and being spaced apart a predetermined distance so that valleys are formed therebetween, the inner duct having an internal diameter sufficiently greater than the external diameter of the optic transmission cable so that the transmission cable may be passed through the inner duct in direct contact with the ribs along the length of the interior surface of said interior duct after the aerial duct has been suspended.

2. An aerial duct as recited in claim 1, wherein said valleys act as reservoirs for storing lubricant introduced into said inner duct for facilitating the passage of the transmission cable through said inner duct.

3. An aerial duct as recited in claim 1, further comprising:
   an intervening web, said web being longitudinally attached to the exterior surface of said first duct, and longitudinally attached to the exterior surface of said second duct so that said first duct and said second duct have substantially parallel longitudinal axes.

4. An aerial duct as recited in claim 1 wherein said first duct and second duct are formed as an integral unit with a web connecting them, the web acting to dissipate stress between the first and second duct.

5. An aerial duct as recited in claim 1, wherein said aerial duct is made from a dielectric material.

6. An aerial duct as recited in claim 5, wherein said dielectric material is polyethylene.

7. An aerial duct as recited in claim 1, wherein there is lubricant between the ribs.

8. An aerial duct as recited in claim 1, wherein said inner duct has an inside diameter from 0.4 inch to 2.0 inches and a wall thickness from SIDR 5 through 21.

9. An aerial duct as recited in claim 1, wherein the rib height is from about 0.005 to 0.250 inch.

10. An aerial duct as recited in claim 9, wherein the rib height is about 0.020 inch.

11. An aerial duct as recited in claim 1, wherein the rib spacing is from about 0.025 to 0.500 inch.

12. An aerial duct as recited in claim 11, wherein the rib spacing is about 0.125 inch.

13. An aerial duct as recited in claim 1, wherein the rib height is from 0.005 to 0.250 inch and the rib spacing is from 0.025 to 0.500 inch.

14. An aerial duct as recited in claim 1, wherein said ribs are spiral.

15. An aerial duct as recited in claim 14, wherein each rib makes about one revolution for about one to six linear feet.

16. An aerial duct as recited in claim 15, wherein each rib makes one revolution for about one to six linear feet and rotates in one direction.

17. An aerial duct as recited in claim 16, wherein the spiral ribs rotate in one direction and then in the other direction.

18. An aerial duct as recited in claim 1, wherein the ribs are longitudinal.

19. An aerial duct as recited in claim 1, wherein said support strand is constructed of high strength steel.

20. An aerial duct as recited in claim 1, wherein said support strand is comprised of galvanized steel.

21. An aerial duct as recited in claim 1, wherein the inner duct is corrugated with ribs.

22. An aerial duct as recited in claim 21, wherein the corrugated ribs are transverse to the length of second duct and the corrugated inner duct may move in an accordion-like fashion in the second duct.

23. An aerial duct as recited in claim 21, wherein the rib spacing is about 0.300 inch and the rib height is about 0.120 inch.

24. An aerial duct as recited in claim 3, wherein said web is notched.

25. An aerial duct as recited in claim 21, wherein said web is notched.

26. An aerial duct as recited in claim 1, wherein said support strand has a diameter of about 0.109 inch to about 0.375 inch.

27. An aerial duct as recited in claim 1, wherein said support strand is comprised of a dielectric material.

28. An aerial duct as recited in claim 27, wherein said dielectric material is a polyaramide composite.

29. An aerial duct having multiple ducts for supporting transmission cable and the like comprising:
   a first duct formed from a first polymer;
   a support strand contained within said first duct, said support strand having a sufficient strength to hold the aerial duct suspended between pole supports;
   a second duct formed from said first polymer, said second duct having an inside surface and an outside surface, said second duct being joined to said first duct;
   a polymeric inner duct having a low coefficient of friction formed from a second polymer contained within said second duct having an exterior surface and an interior surface; and
   a multiplicity of ribs formed along the length of the interior surface of said inner duct, said ribs having a predetermined height and being spaced apart a predetermined distance so that valleys are formed therebetween, the inner duct having an internal diameter sufficiently greater than the external diameter of the transmission cable so that the transmission cable may be passed through the inner duct in direct contact with the ribs along the interior surface of said inner duct after the aerial duct has been suspended.

30. An aerial duct as recited in claim 29 wherein said first polymer is a linear low density polyethylene polymer.

31. An aerial duct as recited in claim 29 wherein said second polymer is a high density polyethylene.

32. An aerial duct as recited in claim 29, wherein said first polymer is an olefinic material.

33. An aerial duct as recited in claim 29, wherein said second polymer is PVC.

34. An aerial duct as recited in claim 29, further comprising:

an intervening web having a predetermined height, said web being longitudinally attached to the exterior surface of said first duct, and longitudinally attached to the exterior surface of said second duct so that said first duct and said second duct have substantially parallel longitudinal axes.

35. An aerial duct as recited in claim 34, wherein said web height of about 0.25 inches.

36. An aerial duct as recited in claim 29, wherein said first duct and second duct are formed as an integral unit.

37. An aerial duct as recited in claim 29, wherein the ribs are corrugated.

38. An aerial duct as recited in claim 29, wherein the second duct has an inside diameter of less than about 2 inches.

* * * * *

UNITED STATES PATENT AND TRADEMARK OFFICE
CERTIFICATE OF CORRECTION

PATENT NO. : 5,678,609
DATED : October 21, 1997
INVENTOR(S) : Robert B. Washburn It is certified that error appears in the above-indentified patent and that said Letters Patent is hereby corrected as shown below:

On the title page:

Item [56] under "U.S. Patent Documents," please insert the following:

| | | |
|---|---|---|
| 1,084,299 | 09/1967 | Great Britain |
| 2,034,928 | 3/1936 | St. John |
| 2,091,265 | 8/1937 | Brown |
| 2,222,497 | 11/1940 | Bins |
| 3,042,353 | 7/1962 | O'Mara |
| 3,357,088 | 12/1967 | Hoffman et al. |
| 3,823,652 | 7/1974 | Lambert |
| 3,885,593 | 5/1975 | Koerber et al. |
| 4,763,983 | 8/1988 | Keith |
| 4,832,442 | 5/1989 | Pappas |
| 4,892,442 | 1/1990 | Shoffner |
| 5,027,864 | 7/1991 | Conti et al. |
| 5,226,456 | 7/1993 | Semak |

Signed and Sealed this

Twenty-eighth Day of April, 1998

*Attest:*

BRUCE LEHMAN

*Attesting Officer*     *Commissioner of Patents and Trademarks*